No. 882,653. PATENTED MAR. 24, 1908.
T. SCULLIN & S. R. SKOV.
CONVERTIBLE AND INTERCHANGEABLE SEAT.
APPLICATION FILED JAN. 22, 1907.
4 SHEETS—SHEET 1.
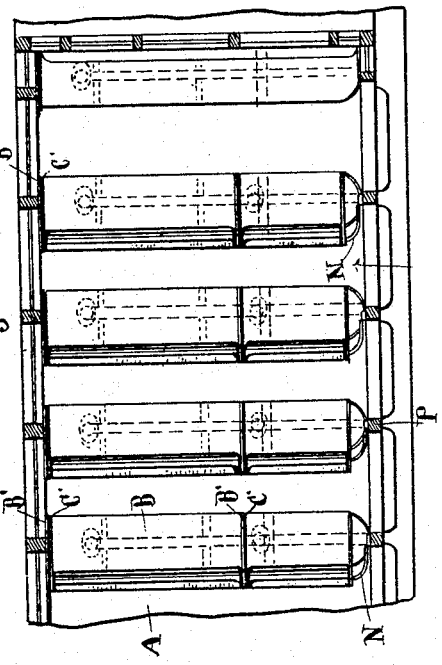
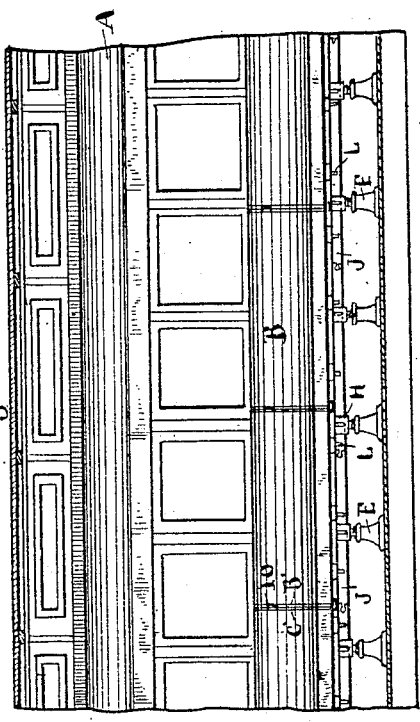
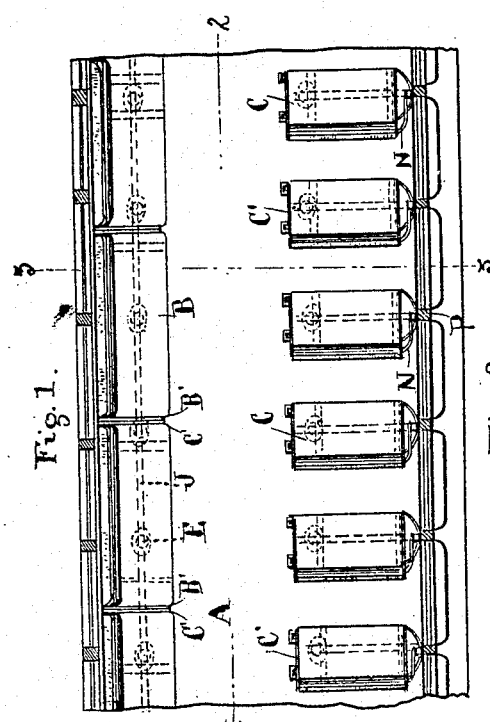
ATTEST
INVENTORS
Terence Scullin
Soren Robertson Skov,
BY Fisher & Moert ATTYS.

No. 882,653. PATENTED MAR. 24, 1908.
T. SCULLIN & S. R. SKOV.
CONVERTIBLE AND INTERCHANGEABLE SEAT.
APPLICATION FILED JAN. 22, 1907.
4 SHEETS—SHEET 2.
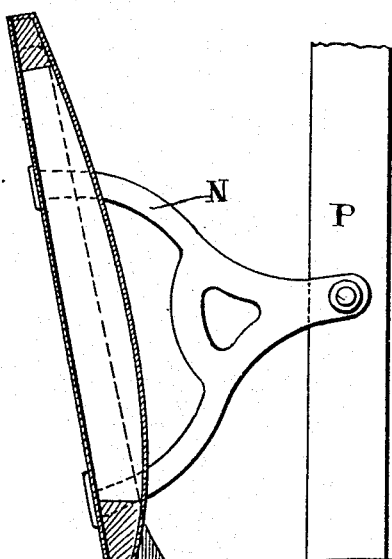
Fig. 5.
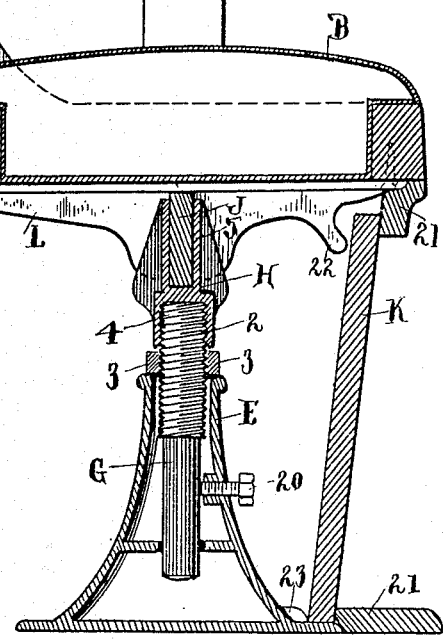
Fig. 6.
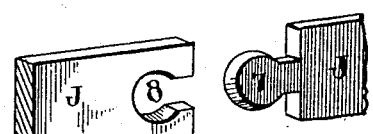
Fig. 7.
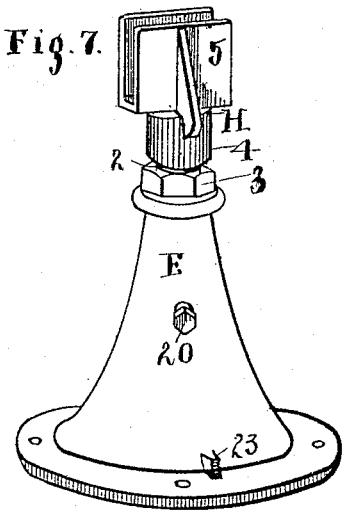
WITNESSES:
E. M. Fisher
J. C. Museum
INVENTORS
Terence Scullin,
BY Soren Robertson Skov.
Fisher & Mosert
ATTORNEYS No. 882,653.
PATENTED MAR. 24, 1908.
T. SCULLIN & S. R. SKOV.
CONVERTIBLE AND INTERCHANGEABLE SEAT.
APPLICATION FILED JAN. 22, 1907.
4 SHEETS—SHEET 3.
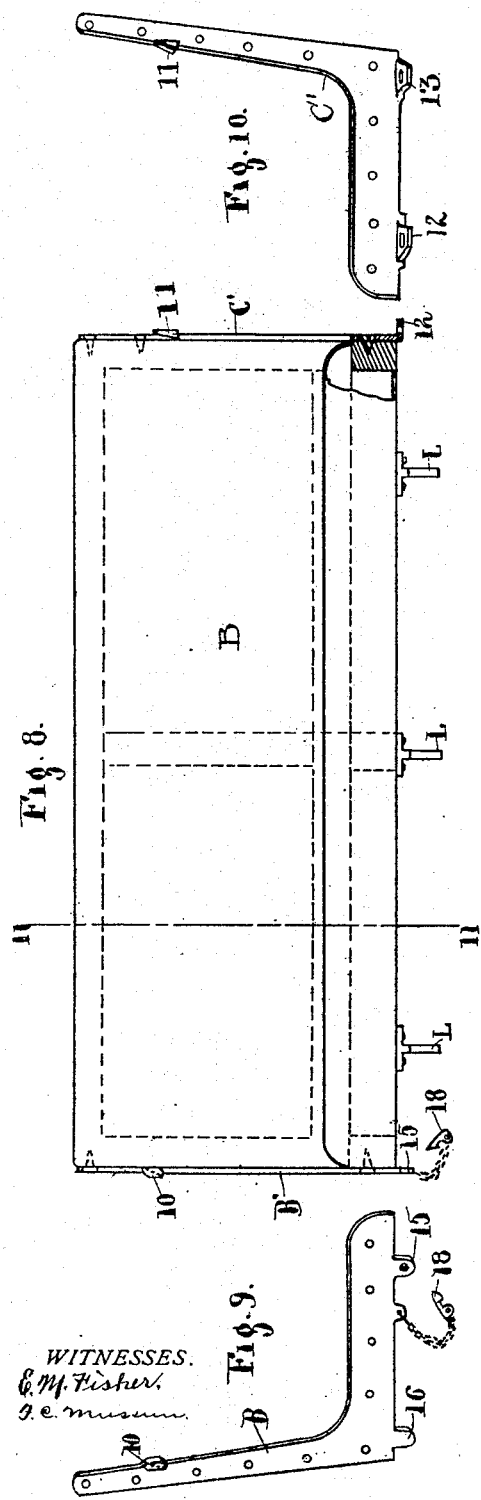
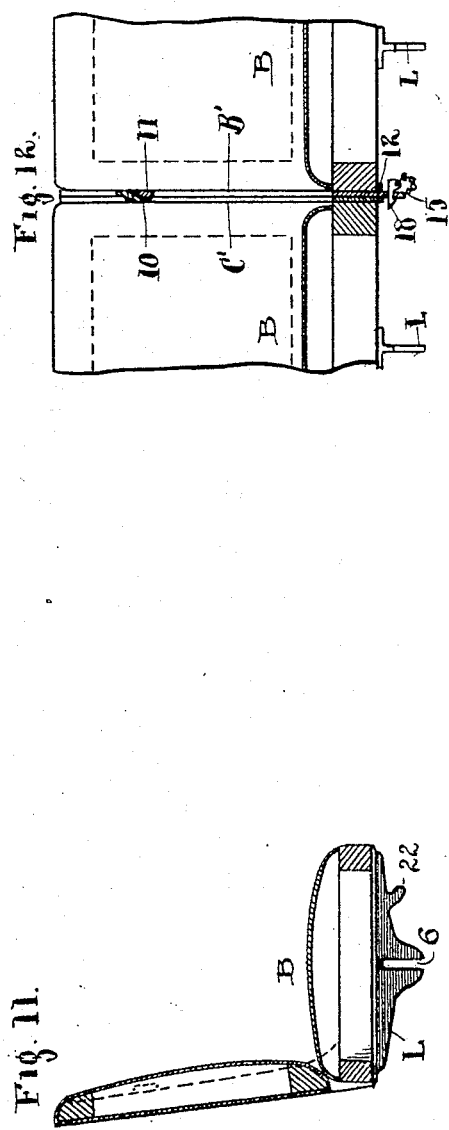
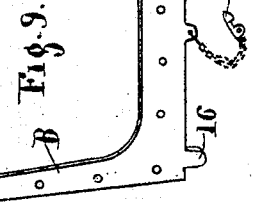
WITNESSES.
E. M. Fisher.
J. E. musum
INVENTORS
Terence Scullin
BY Soren Robertson Skov.
Fisher & Moore
ATTORNEYS No. 882,653. PATENTED MAR. 24, 1908.
T. SCULLIN & S. R. SKOV.
CONVERTIBLE AND INTERCHANGEABLE SEAT.
APPLICATION FILED JAN. 22, 1907.
4 SHEETS—SHEET 4.
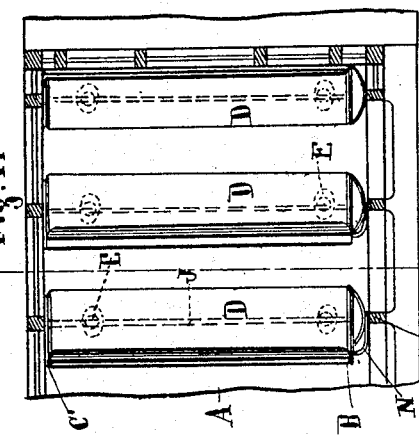
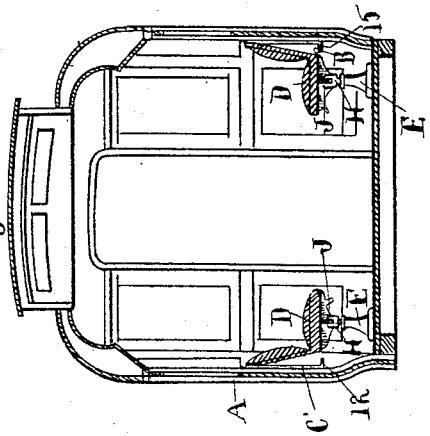
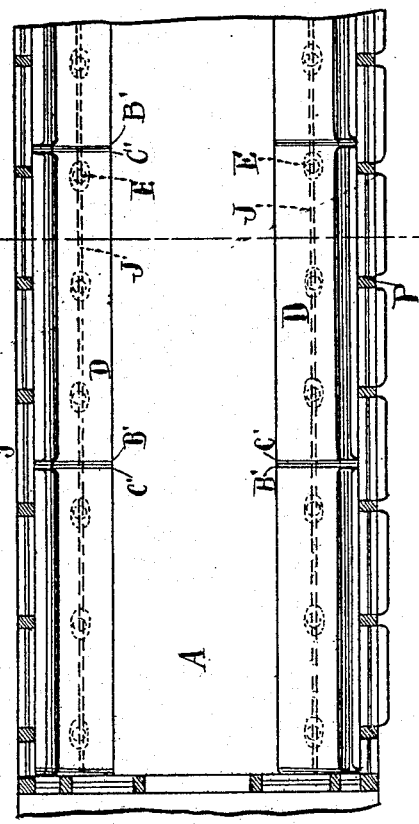
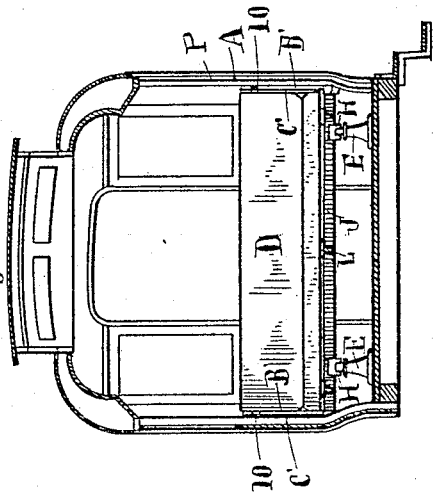
WITNESSES:
G. M. Fisher
F. C. Mussun.
INVENTORS
Terence Scullin
Soren Robertson Skov.
BY
Fisher & Moort
ATTORNEYS

UNITED STATES PATENT OFFICE.

TERENCE SCULLIN AND SOREN ROBERTSON SKOV, OF CLEVELAND, OHIO.

CONVERTIBLE AND INTERCHANGEABLE SEAT.

No. 882,653.

Specification of Letters Patent.

Patented March 24, 1908.

Application filed January 22, 1907. Serial No. 353,557.

*To all whom it may concern:*

Be it known that we, TERENCE SCULLIN and SOREN ROBERTSON SKOV, citizens of the United States, residing at Cleveland, in the county of Cuyahoga and State of Ohio, have invented certain new and useful Improvements in Convertible and Interchangeable Seats; and we do declare that the following is a full, clear, and exact description of the invention, which will enable others skilled in the art to which it appertains to make and use the same.

Our invention relates to convertible and interchangeable seats for motor and other cars, all substantially as shown and described and particularly pointed out in the claims.

In the accompanying drawings Figure 1 shows a horizontal sectional view of a portion of a car body in which some of the seats are arranged transversely and other longitudinally along one side of the car. Fig. 2 is a vertical longitudinal section on line 2, 2, Fig. 1, disclosing the arrangement of the seats along the opposite side of the car. Fig. 3 is a vertical cross section of the car on line 3, 3, Fig. 1, and Fig. 4 is a horizontal section of the car body corresponding to Fig. 1 but showing all the seats arranged transversely from side to side of the car. Fig. 5 is an enlarged cross section of one of the seats taken on a line centrally of one of the base support therefor, as will hereinafter fully appear. Fig. 6 shows two end sections of jointed rails adapted to rest the seats upon, and Fig. 7 is a perspective view of one of the standards and the mechanism thereon which carries the seat bars or rails. Fig. 8 is a front elevation of one of the seats, and Figs. 9 and 10 are end views respectively of the castings at the ends of said seat and by which it is engaged at its end with another seat. Fig. 11 is a cross section on line 11, 11, Fig. 8 and Fig. 12 shows two seats united by the end parts shown in Figs. 9 and 10. Figs. 13 to 16 represent a modification of the seat construction in that each seat section is of the full width of the car. Thus, Fig. 13 is a horizontal sectional view of the car showing the seats arranged longitudinally at each side thereof, and Fig. 14 represents the seats as placed transversely of the car. Fig. 15 is a cross section on line 15, 15, Fig. 14, and Fig. 16 is a cross section on line 16, 16, Fig. 13.

The controlling thought or idea in the construction of car seats as thus shown is to make the seats readily available for either transverse or lengthwise arrangement in the cars for summer or winter use as the case may be, and to effect such arrangement by simple and reliable means, so that the seats can be changed from one position to the other and be rigidly and firmly supported without the use of bolts, screws or other devices of that sort, and are removable from their supports and wholly separate and independent members from the parts in or upon which they are adapted to be supported. Our invention therefore, has to do with seats as such and separate supports therefor and which respectively are so associated and fixed together that no other means than those which the parts themselves embody are required to operatively arrange the same in a car. Now, having these adaptations in view and the convertibility of the car to summer or winter purposes it is to be understood that any suitable car, A, may be used for our purposes, and the invention is as well adapted to cars now in use and which are made for either transverse or side seating as to cars that may hereafter be manufactured and have our invention in view. The seats or seat sections B and C, as in Figs. 1, 2, 3 and 4 are adapted to be connected, and seats D in Figs. 13 and 14 are designed for arrangement either longitudinally or transversely. For convenience in description all said members are referred to as seats, whether long or short. Furthermore, the said seats are similarly supported from the floor whether they be of the kind that extend entirely across the car when arranged transversely as in Fig. 14, or of the shorter kind, as in Figs. 1 and 4 and which require two seats to extend entirely across the car. The only difference as to these different sizes or lengths of seats appears in their adaptation, or connections when the shorter seats are employed. Otherwise all the seats are alike supported from the floor of the car upon a suitable base or standard E fixed on said floor and which is adapted to receive a spindle G having a somewhat enlarged and threaded upper portion —2— engaged by a nut —3— adapted to rest upon the top of base E and by which the elevation of the spindle and the parts supported thereon is determined. A carrier or rest H for the chair supporting rail J is removably engaged on said spindle, and to this end is provided with an internally threaded socket portion —4— at its bottom screwed upon head —2— of spindle G above nut —3—. Said carrier having an open slotted top portion —5— with parallel walls of a sufficient width and elevation to make a firm and rigid seat for the otherwise free rails or bars J which carry the respective seats. The said bars have no other rest than in and between the walls of heads —5—, and are provided with suitable interlocking joints at their meeting ends in which the said ends are adapted to have a necessary amount of play in respect to each other for purposes of adjustment to a common level, but are otherwise practically as firmly held together in and by said joints as if the rail were one continuous piece. These joints may come within the walls of the supporting heads —5— or at other points, and in this instance one rail has a headed tongue —7—, and the other a matching recess —8— engaged by said tongue, but this is only one of different ways of making this connection.

The seats are equipped with transverse castings or bars L at their bottom at intervals which have transverse open slots —6— at their center of a size to seat snugly down over rails J and hold the seat firmly on said rails. The backs of the seats are engaged in some instances by suitable end brackets N as usual to car posts P, and no other support than that just described is required for said seats. If rail or bar J requires to be raised or lowered the necessary adjustment is made by nuts —3—, and rails J are so firmly held on standards E through carriers H that they cannot rock thereon, as also are the seats on said rails. But this leaves the seats perfectly free to be lifted off the rails, and the rails to be lifted off the carriers, and thus we have also a convenient knockdown construction in which the individual parts are independent members, and are easily assembled for use as well as separated.

The seats B and C are provided with frame members B' and C' respectively, at their meeting ends adapted to be separately and firmly interlocked. To this end member B' has a laterally extending lug 10 with an inclined surface adapted to be engaged by inclined lug 11 on the edge of member C', so that when said lugs are brought together they lock one upon the other on their inclined surfaces and firmly unite said members B' and C' at their top. At the bottom said parts are connected by side lugs 12 and 13 on part C' adapted to be engaged by short legs 15 and 16 on part B', leg 15 having a transverse slot adapted to receive a locking key 18.

Whenever a change in the arrangement of the car seats is made, spindles C are adapted to rotate freely upon standards E to bring heads —H— in the right relation to carry bars —J— either longitudinally or transversely of the car, and a bolt 20 screwed within standard E serves to lock spindle G in set position.

A base or foot board K, see Fig. 5, may be arranged at the front of the seats if desired, by providing suitable supports therefor comprising separate cleats 21 upon each seat and upon the floor of the car, and suitable lugs 22 and 23 on castings L and standards E, respectively.

What we claim is:

1. In cars, a car seat having an open slot centrally at its bottom, in combination with separate standards, rotatable supports in said standards having open slotted heads, and a rail loosely engaged in said slotted heads and in the open slot in the bottom of the seat and supporting the seat.

2. In cars, a seat support comprising a plurality of standards adapted to be fixed to a car floor and a separate removable and adjustable head on each standard, a rail resting in said heads and car seats having open slotted parts on their bottom engaged over said rail.

3. In cars, a plurality of seats, a single rail on which said seats are removably seated, and a plurality of standards in a line centrally beneath said seats and separate means in each standard to fix the elevation of said rail.

4. In cars, a plurality of seats and a support comprising a series of separate standards arranged in a line and adjustable supports on said standards, in combination with a seat supporting rail removably engaged in said several supports and extending transversely beneath said seats from one to the other.

5. In cars, a plurality of disconnected standards adapted to be fastened to the floor of a car and having open slotted heads adjustably engaged therein, a seat supporting rail removably supported between the walls of said heads, and a seat having an open slot at its center removably engaged on said rail.

6. In cars, a plurality of independent standards, an open slotted head vertically adjustable in each standard, seat supporting rails engaged in said heads and seats having open slots centrally at their bottom adapted to rest on said rails.

7. In cars, a plurality of independent standards, open slotted heads having threaded spindles engaged in said standards and nuts to raise and lower said spindles, in combination with a seat supporting rail removably engaged in a plurality of said heads.

8. In cars, a standard and a threaded spindle vertically adjustable therein and a separate head mounted on top of said spindle and having an open slot with parallel walls adapted to hold a seat supporting rail, in combination with a flat sided seat supporting rail lodged in said head and a seat engaged centrally at its bottom on said rail.

9. In cars, a support for a series of seats comprising a plurality of separate and independent standards and a vertically adjustable rail support on each standard, in combination with rails having jointed connection at their ends engaged in said supports and adapted to carry a series of car seats.

10. In cars, a plurality of independent seat supporting standards, a rotatable slotted head on each standard, and jointed rails supported in said heads, in combination with seats having open slots engaged upon said rails, said parts constructed to prevent the seats from rocking on said rails.

11. In cars, a seat having a transversely arranged bar fixed on its bottom provided with a central downwardly open slot, in combination with a flat sided rail engaged by said slot and constituting the sole support for said seat, and a plurality of independent supports in which said rail is removably seated.

In testimony whereof we sign this specification in the presence of two witnesses.

TERENCE SCULLIN
SOREN ROBERTSON SKOV.

Witnesses:
R. B. MOSER,
E. M. FISHER.